United States Patent
Fischerström

(10) Patent No.: US 11,263,532 B2
(45) Date of Patent: Mar. 1, 2022

(54) SYSTEM AND METHOD FOR BREAKING ARTIST PREDICTION IN A MEDIA CONTENT ENVIRONMENT

(71) Applicant: SPOTIFY AB, Stockholm (SE)

(72) Inventor: Ludvig Fischerström, Stockholm (SE)

(73) Assignee: SPOTIFY AB, Stockholm (SE)

( * ) Notice: Subject to any disclaimer, the term of this patent is extended or adjusted under 35 U.S.C. 154(b) by 1048 days.

(21) Appl. No.: 15/135,959

(22) Filed: Apr. 22, 2016

(65) Prior Publication Data

US 2017/0308794 A1    Oct. 26, 2017

(51) Int. Cl.
| | |
|---|---|
| *G06N 5/02* | (2006.01) |
| *G06F 16/68* | (2019.01) |
| *G06F 16/2457* | (2019.01) |
| *G06F 16/635* | (2019.01) |
| *G06F 16/48* | (2019.01) |
| *G06F 16/435* | (2019.01) |
| *G06F 16/78* | (2019.01) |
| *G06F 16/735* | (2019.01) |
| *G06F 16/9535* | (2019.01) |

(52) U.S. Cl.
CPC ....... *G06N 5/022* (2013.01); *G06F 16/24578* (2019.01); *G06F 16/435* (2019.01); *G06F 16/48* (2019.01); *G06F 16/635* (2019.01); *G06F 16/68* (2019.01); *G06F 16/735* (2019.01); *G06F 16/78* (2019.01); *G06F 16/9535* (2019.01)

(58) Field of Classification Search
CPC ............ G06Q 30/02; G06Q 30/0224; G06Q 30/0226; G06Q 30/0231
See application file for complete search history.

(56) References Cited

U.S. PATENT DOCUMENTS

| | | | | |
|---|---|---|---|---|
| 7,536,322 | B1 * | 5/2009 | Selinger | G06Q 30/02 |
| | | | | 705/26.5 |
| 8,843,500 | B2 * | 9/2014 | Nogues | H04N 21/8113 |
| | | | | 707/748 |
| 9,122,749 | B2 * | 9/2015 | Elmore | G07F 17/32 |
| 9,753,988 | B1 * | 9/2017 | McGilliard | G06Q 30/0201 |
| 9,760,963 | B2 * | 9/2017 | Freeman | G07F 17/32 |

(Continued)

OTHER PUBLICATIONS

Chon, Song Hui et al.; Predicting Success from Music Sales Data—A statistical and adaptive approach; 2006; ACM; AMCMM'06; pp. 83-87. (Year: 2006).*

(Continued)

*Primary Examiner* — Stanley K. Hill
(74) *Attorney, Agent, or Firm* — Tucker Ellis LLP

(57) ABSTRACT

In accordance with an embodiment, described herein is a system and method for predicting artists that create media content who are more likely to increase in popularity. Users are determined who requested playback of media content items associated with one or more generators of popular media content within a window of time. One or more early adopters are determined from these users based on a quantity of the one or more generators of popular media content whose media content items were requested for playback by the users. Artists that create media content who are more likely to increase in popularity than other artists that create media content are then predicted based on following further requested playback of media content items by the one or more early adopters.

21 Claims, 5 Drawing Sheets

(56) References Cited

U.S. PATENT DOCUMENTS

| | | | | |
|---|---|---|---|---|
| 2003/0135513 | A1* | 7/2003 | Quinn | G06Q 30/02 |
| 2008/0097821 | A1* | 4/2008 | Chickering | G06Q 30/02 |
| | | | | 705/7.29 |
| 2010/0121857 | A1* | 5/2010 | Elmore | G06F 16/24578 |
| | | | | 707/748 |
| 2010/0318484 | A1* | 12/2010 | Huberman | G06Q 30/02 |
| | | | | 706/46 |
| 2013/0311408 | A1* | 11/2013 | Bagga | G06N 20/00 |
| | | | | 706/12 |
| 2015/0032673 | A1* | 1/2015 | Hu | G06Q 50/01 |
| | | | | 706/12 |
| 2015/0317680 | A1* | 11/2015 | Richman | G06Q 30/0277 |
| | | | | 705/14.55 |
| 2017/0024655 | A1* | 1/2017 | Stowell | G06N 7/005 |

OTHER PUBLICATIONS

International Search Report and Written Opinion issued by International Searching Authority for International Application No. PCT/EP2017/058496, dated Jun. 21, 2017 (12 pages).

Written Opinion of the International Preliminary Examining Authority dated Mar. 14, 2018 for PCT Application No. PCT/EP2017/058496, 8 pages.

International Preliminary Report of Patentability dated Jul. 5, 2018 for PCT Application No. PCT/EP2017/058496, 12 pages.

\* cited by examiner

SYSTEM AND METHOD FOR BREAKING ARTIST PREDICTION IN A MEDIA CONTENT ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to identifying artists that create media content who are more likely to increase in popularity than other artists that create media content.

BACKGROUND

Today's consumers have the ability to access a tremendous amount of digital media content, such as music and videos, at any location or time of day, using a wide variety of media devices, including desktops, laptops, dedicated media players, smartphones, etc.

Consumers can access media content from service providers operating on a variety of different service models. For example, some commercial music streaming, podcast and video service providers allow consumers to browse, search and playback media content items by artist, song, album, genre, playlist, or record label. Other service providers may allow a consumer to request playback of playlists, while still other service providers operate using a model analogous to radio, creating "radio stations" of songs chosen based on specified genres, decades, artists, etc.

A service provider may choose to offer multiple different service models having features and playback options dependent on revenue source. For example, many service providers provide both a free, advertisement supported service and a premium, subscription based service that eliminates advertisements and that can offer additional features such as improved audio quality and offline listening.

The range and type of available media content is varied and continually growing, and predicting which artists or media content will break out in popularity can be difficult, particularly from amongst those artists that are relatively unknown or just beginning their careers, and media content by such artists. If a service provider can predict that an artist will break out, the service provider can seek to partner with the artist early for possible promotional and recording deals. A partnership between the service provider and an artist can also provide an opportunity for the service provider to push media content by artists to playlists and radio stations to grow the artist's fan base, associating the service provider with "hip" or "fresh" artists and establishing the service provider as the source for discovering new and interesting media content.

SUMMARY

In accordance with an embodiment, described herein is a system and method for predicting artists that create media content who are more likely to increase in popularity. Users are determined who requested playback of media content items associated with one or more generators of popular media content within a window of time. One or more early adopters are determined from these users based on a quantity of the one or more generators of popular media content whose media content items were requested for playback by the users. Artists that create media content who are more likely to increase in popularity than other artists that create media content are then predicted based on following further requested playback of media content items by the one or more early adopters.

DETAILED DESCRIPTION

Figure 1:
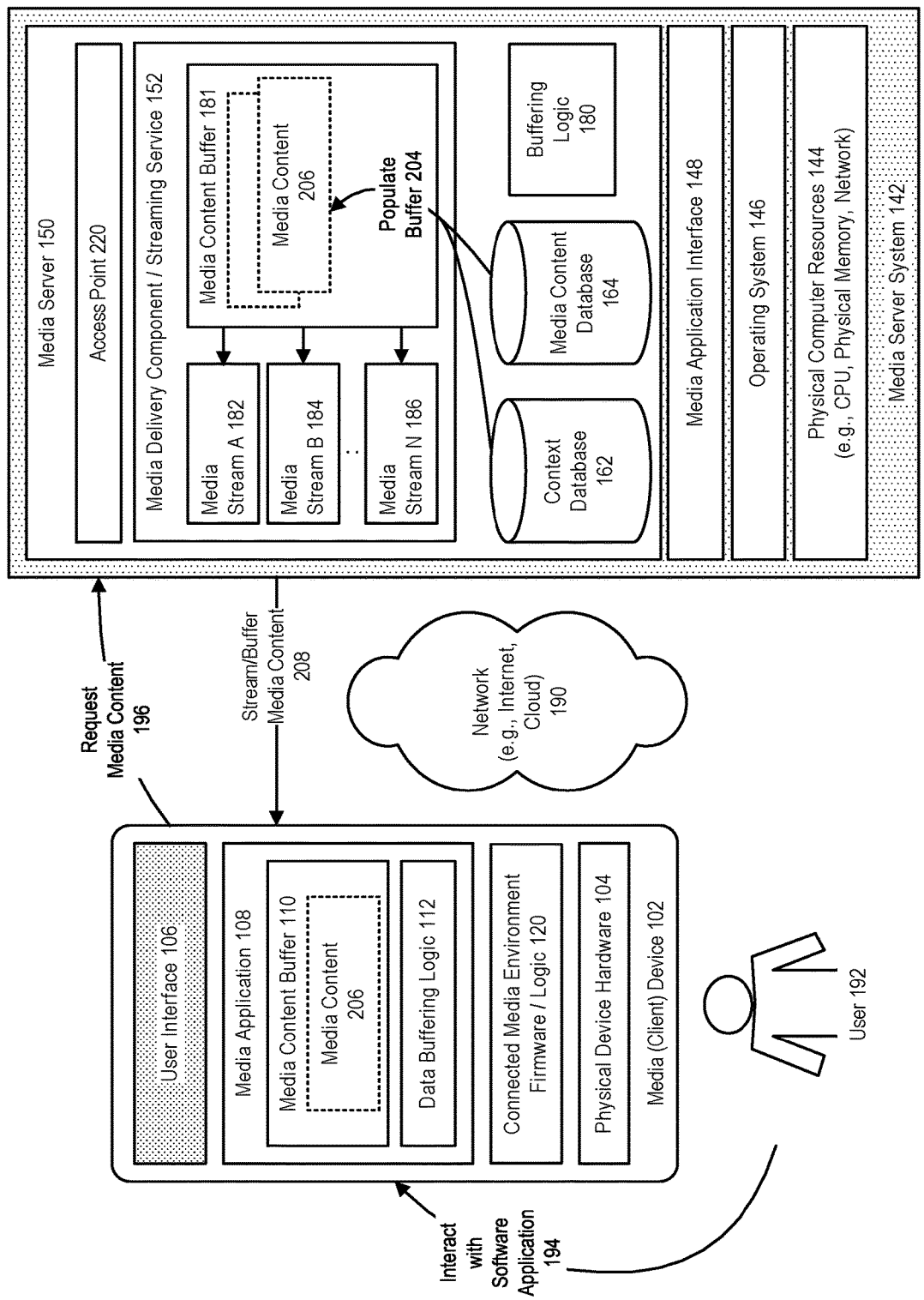
FIG. 1 illustrates an example of a system for providing media content, in accordance with an embodiment.

Embodiments will now be described more fully hereinafter. Embodiments can comprise many different forms and should not be construed as limited to those set forth herein; rather, these embodiments are provided by way of example so that this disclosure will be thorough and complete, and will fully convey the scope of the invention to those persons skilled in the art. Like reference numbers refer to like elements or method steps throughout the description.

In accordance with an embodiment, described herein is a system and method for predicting artists that create media content who are more likely to increase in popularity. Users are determined who requested playback of media content items associated with one or more generators of popular media content within a window of time based on at least some historical data from a set of aggregated historical data. One or more early adopters are determined from these users based on a quantity of the one or more generators of popular media content whose media content items were requested for playback by the users. Artists that create media content who are more likely to increase in popularity than other artists that create media content are then predicted based on following further requested playback of media content items by the one or more early adopters.

In accordance with an embodiment, determining one or more generators of popular media content further includes determining, based on at least some historical data from a set of aggregated historical data, a plurality of popular media content items. The aggregated historical data can include playback count for a plurality of media content items, and a popular media content item can be determined based on growth in playback count over time for a media content item from the plurality of media content items that exceeds a first threshold. The one or more popular generators of the plurality of popular media content items can then be determined. Further, in some embodiments, the aggregated historical data further can include search count for media content items. A popular media content item can then be determined based on growth over time in search count for a media content item that exceeds a third threshold.

In accordance with an embodiment, the set of aggregated historical data can be generated by aggregating playback request data for a plurality of users, and the playback request data can include the identity of a media content item requested by a user for playback and the identify of a generator of the media content item.

In accordance with an embodiment, determining users who requested playback of media content items associated with the determined one or more generators within a window of time can include determining users who requested playback of media content items associated with the determined one or more popular generators for a period of time before a second threshold.

In accordance with an embodiment, predicting artists that create media content who are more likely to increase in popularity is periodically repeated, for example to account for new media content, changes in listening trends, new users who can be identified as early adopters, and additional data.

Media Content Environment

FIG. 1 illustrates an example of a system for providing media content, in accordance with an embodiment.

As illustrated in FIG. 1, in accordance with an embodiment, a media device 102, operating as a client device, can receive and play media content provided by a backend media server system 142 (media server), or by another system or peer device. In accordance with an embodiment, the client device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a software media application 108, together with an in-memory client-side media content buffer 110, and a data buffering logic or component 112, which can be used to control the playback of media content received from the media server, for playing either at a requesting client device (i.e., controlling device) or at a controlled client device (i.e., controlled device), in the manner of a remote control. A connected media environment firmware, logic or component 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment which supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling client device, and their audio speaker as a controlled client device to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination client device to which the media content is being streamed changes, from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client devices to search within repositories of media content, to locate particular media content items.

In accordance with an embodiment, a buffering logic or component 180 can be used to retrieve or otherwise access media content items, in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device, and issue requests to access media content, for example the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content, 206 including one or more streams of media content data, and can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a Spotify media content environment, most Spotify clients connect to various Spotify back-end processes via a Spotify "accesspoint", which forwards client requests to other servers, such as sending one or more metadataproxy requests to one of several metadataproxy machines on behalf of the client or end user.

Figure 2:
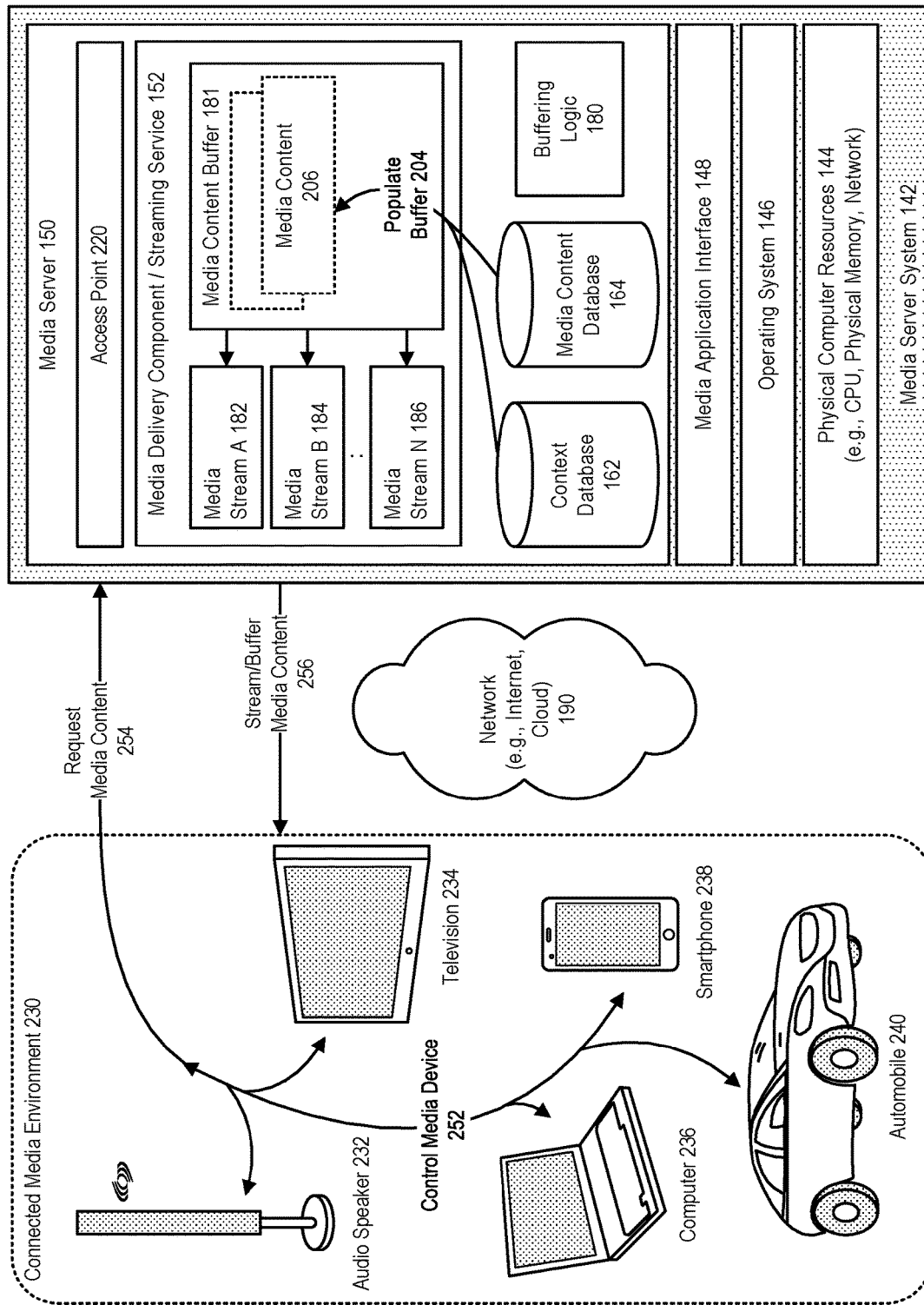
FIG. 2 further illustrates an example of a system for providing media content, in accordance with an embodiment.

FIG. 2 further illustrates an example of a system for providing media content, in accordance with an embodiment.

As illustrated in FIG. 2, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as a firmware logic or component, or within, for example, a separate set-top box or similar aftermarket device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
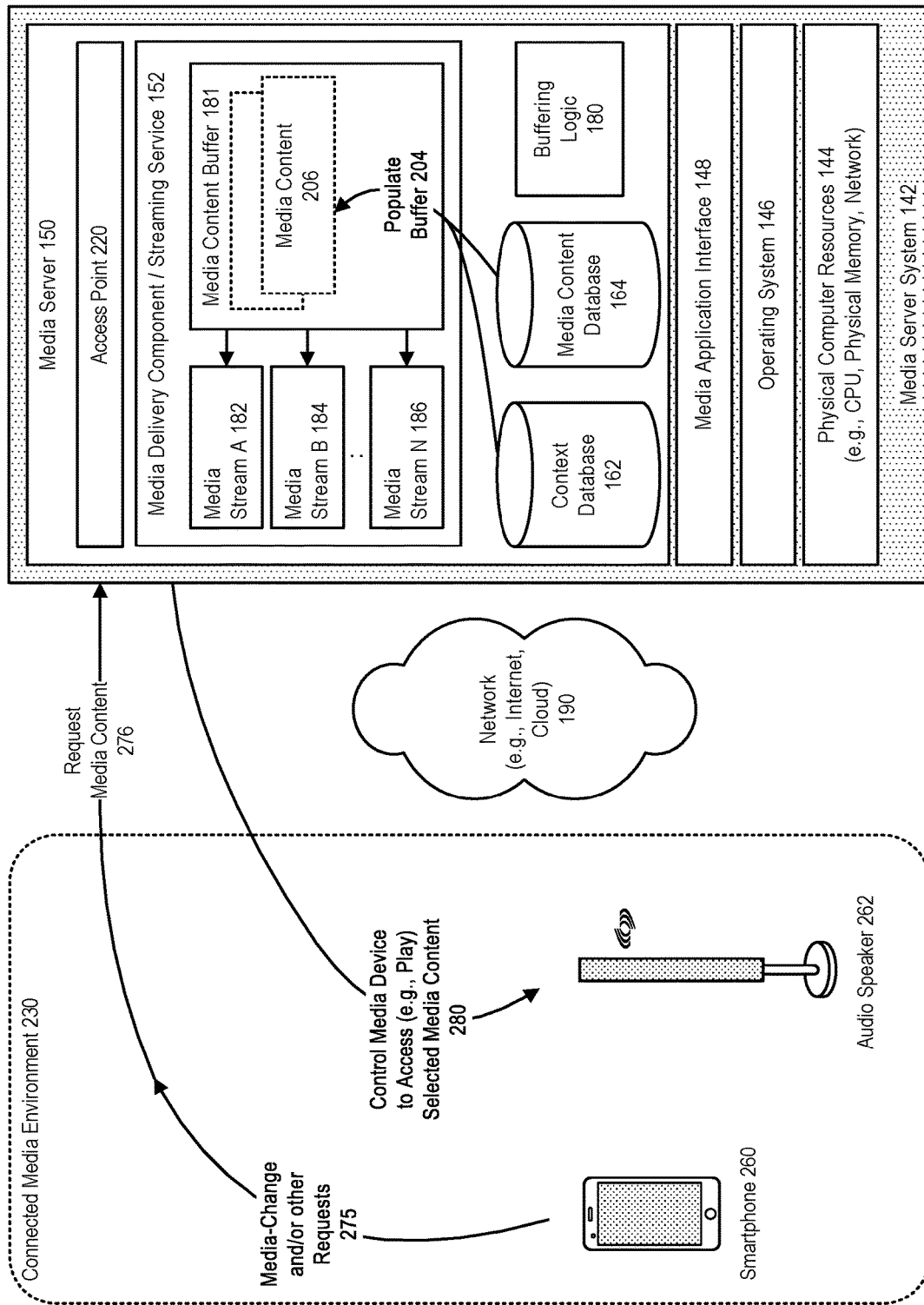
FIG. 3 further illustrates an example of a system for providing media content, in accordance with an embodiment.

FIG. 3 further illustrates an example of a system for providing media content, in accordance with an embodiment.

As illustrated in FIG. 3, a user can utilize, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

Breaking Artist Prediction

In accordance with an embodiment, the system can predict artists or other artists that create media content who are relatively unknown, but which are likely to break in the relative near term.

As used herein, the term "artist" can refer to any generator of a media content item and is not intended to be limiting. For example, an artist can be a composer and/or performer of a musical piece, a speaker of a spoken word content item such as a lecture, poem or audiobook, a curator of media content, a record label responsible for publishing and distributing media content, or some other individual or group of individuals associated with media content. Further, the terms "break" and "breaking" can refer to an artist experiencing a sudden or relatively sudden increase in popularity or expansion in fan base.

Predicting artists that are likely to break and increase in popularity can provide an advantage to a service provider and that service provider's users.

For example, a service provider that predicts that an artist will break using a system and method in accordance with an embodiment can promote the artist prior to the artist breaking. If the service provider regularly promotes artists that subsequently break, the service provider can develop a reputation as a trendsetter and reliable source for discovering new media content, which can lead to an increase in user base and an increase in user loyalty.

Further, a service provider can gain a competitive advantage by predicting that an artist will break and approaching that artist for purposes of collaboration. Collaboration can involve a variety of business and promotional activities. For example, a service provider can collaborate with an artist for marketing purposes, for developing creative working relationships between the service provider and the artist, and/or for facilitating creative working relationships between the artist and other artists.

Figure 4:
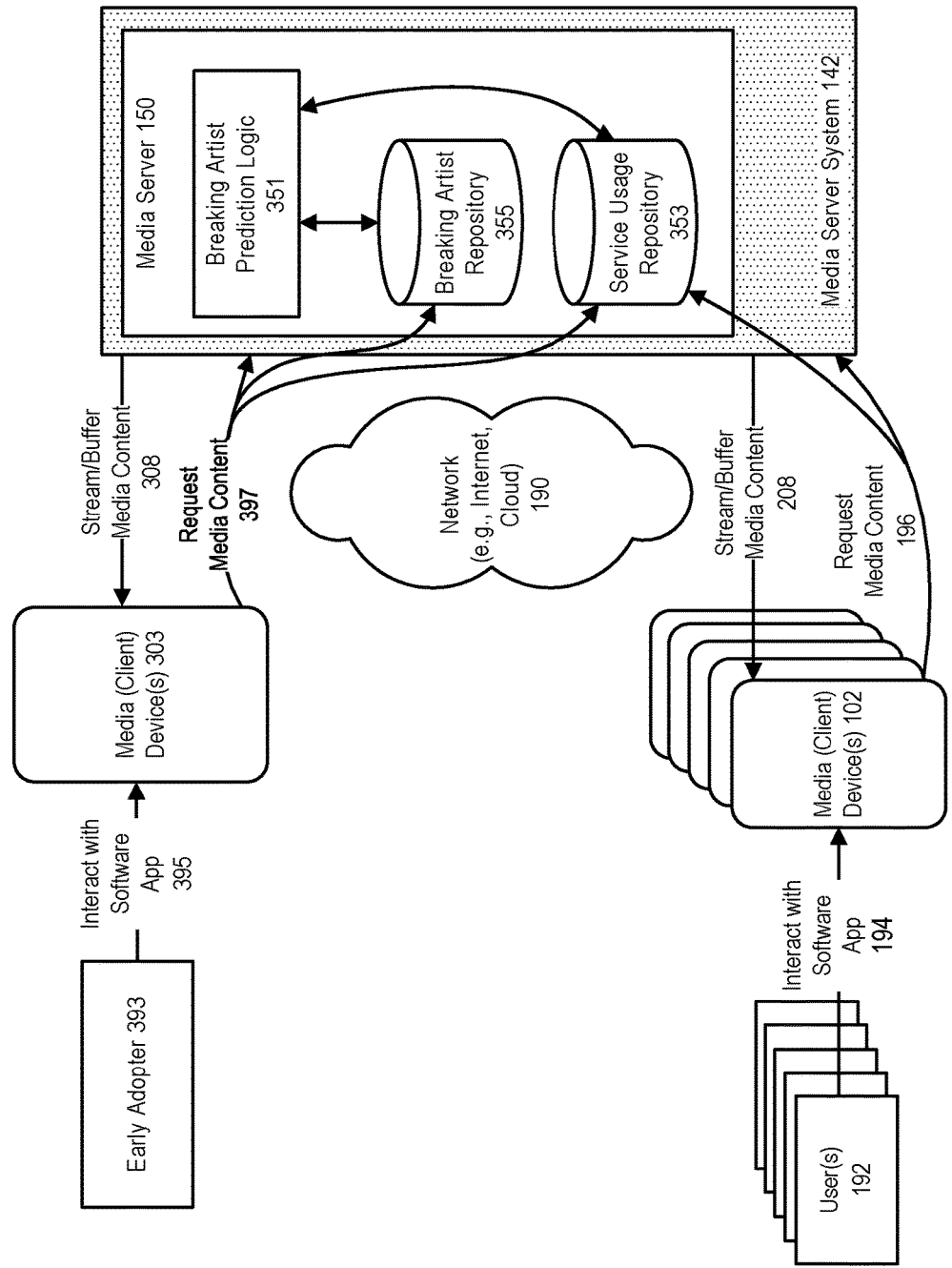
FIG. 4 illustrates a system for predicting breaking artists, in accordance with an embodiment.

FIG. 4 illustrates a system for predicting breaking artists, in accordance with an embodiment. The system can include a backend media server system with a media server operating thereon, as described above. The media server can include a breaking artist prediction logic or component 351 executing instructions for performing methods in accordance with embodiments.

As will be further described below, one or more early adopters from amongst a service provider's user base can be determined based on historical data, such as media content playback and/or search data, stored in a service usage database 353 accessible to the breaking artist prediction logic. Historical data are aggregated over time from the user base. As previously described, a user can interact with a media application via a media (client) device connected with the media server to search for media content, to interact with features of the media application, and to request playback of media content as permitted by the service model available to the user. At least some of the data associated the user's interaction with the media server via the media application can be stored in the service usage database as historical data. As shown, data related to a user's requests for media content are stored in the service usage database and the media server responds to the user's requests by streaming media content to the user's media device.

In accordance with an embodiment, the breaking artist prediction logic can determine artists that have increased in popularity in the past based on the historical data. A user who requested playback of media content from a plurality of breaking artists is determined and assigned the role of early adopter 393. The breaking artist prediction logic can thereafter predict future breaking artists based on further playback requests from an early adopter interacting with their media device 303 via the software application 395.

Data associated with the further requested media content 397 from the one or more early adopters can be stored, for example, in a breaking artist database 355. The media server responds to an early adopter's requests by streaming media content 308 to the user's media device. The user determined to be an early adopter need not have any knowledge that they are an early adopter, as the media server responds by streaming the requested media content, as it responds to all users.

In accordance with an embodiment, the breaking artist prediction logic uses the data stored in the breaking artist database to predict artists that will break in the future. For example, breaking artists can be predicted based on the number of early adopters requesting media content associated with an artist. Alternatively or additionally, data associated with playback requests can be weighted, for example based on the identity of the early adopter requesting playback. In accordance with an embodiment, the breaking artist prediction logic can analyze the weighted data to determine false and true positives, for example using a classification tree or other decision tool.

In accordance with an embodiment, the system can predict artists that are more likely break based on listening patterns of early adopter. Historical data collected by the system is used to first determine those users that are early adopters. For example, historical data can be used to first identify those artists that have already gained popularity, and which would have been deemed a breaking artist by the system. Historical data can comprise data associated with playback of media content items and aggregated by a media server. The data associated with playback of media content items can include playback count and/or search count for each of the media content items.

In accordance with an embodiment, an artist can be deemed to be "breaking" based on historical data if the popularity of the artist exceeds a minimum playback threshold while having experienced growth in popularity that exceeds a minimum growth threshold.

As an arbitrary example, a minimum playback threshold may be 200,000 playback requests over the course of a month, with a minimum growth threshold being a month-to-month increase in playback requests of 300%. These numbers are merely exemplary, and a minimum playback threshold may be higher or lower, e.g. 50,000 playback requests over the course of a month, while the growth threshold can be lower or higher, e.g. a month-to-month increase in playback requests of 1000%.

Metrics for determining whether an artist is a breaking artist can be flexible, and can vary over time and between genres, formats, and audience demographics. For example, a minimum playback threshold for a breaking pop singer may be 200,000 playback requests in a month, while a minimum playback threshold for a breaking pianist that records classical pieces may be 20,000 playback requests in a month. Further, the window of time sampled from historical data for determining playback requests can vary. For example, the playback threshold can be based on a weekly time frame, or multi-month time frame.

In accordance with an embodiment, historical data aggregated over a window of time can be analyzed to identify breaking artists. In accordance with an embodiment, growth rate can be determined, for example, based on growth in monthly active users. A monthly active user for an artist can be identified as a user that requests playback for a media content item associated with that artist at least once in the last monthly period (which can be defined, for example, as the previous four weeks (28 days)). The monthly active user number is a rolling number, and each day an artist can have a specific monthly average user number that is calculated based on the last four weeks that identifies how many unique users are listening to this artist. After the user's last playback request for media content associated with the artist is no longer within the last monthly period for a particular day, the user is no longer a monthly active user for that artist.

In accordance with an embodiment, to determine the growth rate for an artist, a count of monthly active users that request playback of media content associated with the artist can be determined for an initial month-long period in which media content is available for playback. A count of monthly active users that request playback of the media content for an artist can then be determined for a succeeding month and relative growth can be calculated based on the counts for the initial and succeeding months.

Optionally, relative growth can be calculated for each pair of preceding and succeeding months for a plurality of months to determine any changes in relative growth that may indicate that an artist is breaking historically.

The artists determined as breaking from the historical data can be ordered based on growth rate and total playback count and the breaking artists at the top as ordered can be filtered for further analysis, with the top number being predefined. For example, the top 150 artists ordered by highest growth rate can be filtered for further analysis.

In accordance with an embodiment, the system can then determine those users who requested playback of media content from the top breaking artists prior to the breaking. In one embodiment, the determined users can be assigned a breaking artist count for each of the different breaking artists that the user is determined to have requested playback for within a window of time prior to the artist breaking. The window of time can be predetermined to reduce computation time.

For example, if a two week period is selected as a window of time, the system can determine a specific date that the artist breaks and then determine the users that requested playback of media content from the artist two weeks prior to that specific date. The specific date that the artist breaks can be calculated many different ways. For example, the specific date can be assigned based on a date where a slope of relative growth in playback requests is steepest or where a slope of relative growth in playback requests begins to exceed a threshold. The window of time can be larger or smaller based on the amount of data available to the system and the amount of computation required.

In an alternative embodiment, the users can receive a weighted count for each breaking artist, for example based on how much earlier playback of media content was requested prior to the artist breaking.

For example, if five months of historical data is available for an artist, the artist is determined to have become breaking in the fifth month and a five week window of time is used for analysis, a user that requested playback of media content in the first week of the five week window of time can receive a slightly higher weighted count. There are many ways in which user playback requests of media content from breaking artists can be counted. For example, a count can be weighted according to the number of requests for playback from the user of media content for each breaking artist in the window of time prior to the artist breaking. If the user has very high number of requests for media content from a breaking artist, the count assigned to the user can be weighted higher. The system and method can then order the users that requested playback of media content from breaking artists according to count. Once the users are ordered, the users at the top as ordered can be filtered for further analysis.

In accordance with an embodiment, the filtered users can then be further ordered using an early adopter score assigned to each user for the purposes of ordering. The early adopter score can be determined based on a statistical correlation between, for example, the relative growth of an artist's monthly active users and each user's streams. Using the statistical correlation, calculation of early adopter scores can be formulated to identify users that listen to those breaking artists that have grown more in popularity then other breaking artists. Thus, a user can receive a higher early adopter score if that user has repeatedly listened to an artist that has grown significantly in popularity and infrequently listened to an artist that has grown less significantly in popularity.

In accordance with an embodiment, the method can apply a correlation procedures such as a Pearson's correlation to order the filtered users. However, in other embodiments, some other statistical technique or correlation can be used to determine an early adopter score for ordering the filtered users.

Still further, methods for predicting breaking artists can be repeated periodically to identify additional early adopters, or to remove a user from early adopter status.

In accordance with an embodiment, once early adopters have been determined from among the users and early adopter scores have been calculated, systems and methods can be applied to predict artists that are more likely to break in the future than other artists. Potential breaking artists associated with media content items requested for playback by early adopters are identified for a period of time preceding application of the method. A potential breaking artist is an artist streamed by at least one early adopter during the period. For example, potential breaking artists can be identified for a preceding period of two weeks. The potential breaking artists can then be ordered by the probability to break using the early adopter scores calculated for the early adopters.

In accordance with an embodiment, an artist's probability to break can be determined using prediction features that can include, for example, a threshold value of relative growth rate in monthly average user count, a raw number of early adopters requesting playback of media content associated with the artist, and one or more weighted factors.

One weighting factor assigned to an artist includes a play score calculated based on the number of playback requests of media content associated with the artist, with each playback requested weighted by an early adopter score of the early adopter associated with the playback request. The weighted playback requests can then be summed to determine a playback score for the artist, as follows:

$$\text{Play score} = \sum_{i}^{N} \text{playback } request_i * \text{early adopter } score_i$$

where N=the number of early adopters requesting playback (e.g., streaming) of media content associated with the artist and i=each early adopter. The play score is weighted in favor of artists whose media content is requested for playback by early adopters having high early adopter scores, although artists whose media content has a high number of playback requests from early adopters with relatively low adopter scores can also generate a high play score.

Another weighting factor assigned to an artist can include the average play score calculated by dividing the play score for each artist by the number of early adopters requesting playback of media content associated with the artist.

In accordance with an embodiment, the prediction features themselves are then weighted, a final score is calculated for each artist and the artists are ordered according to the final scores. The top artists represent a prediction of artists that are likely to break. In accordance with an embodiment, a service provider can then act on this prediction to promote, market, collaborate, etc., with these artists.

In accordance with an embodiment, the data from the breaking artist database as well as the prediction features described above can be used in an analysis using a classification tree or other tool. A classification tree can be used, for example, to determine false and true positive predictions of breaking artists. A classification tree can, for example, divide the artists based on a threshold monthly average user relative growth rate, and then further subdivide and score the artists in the classification tree according to the prediction features.

Figure 5:
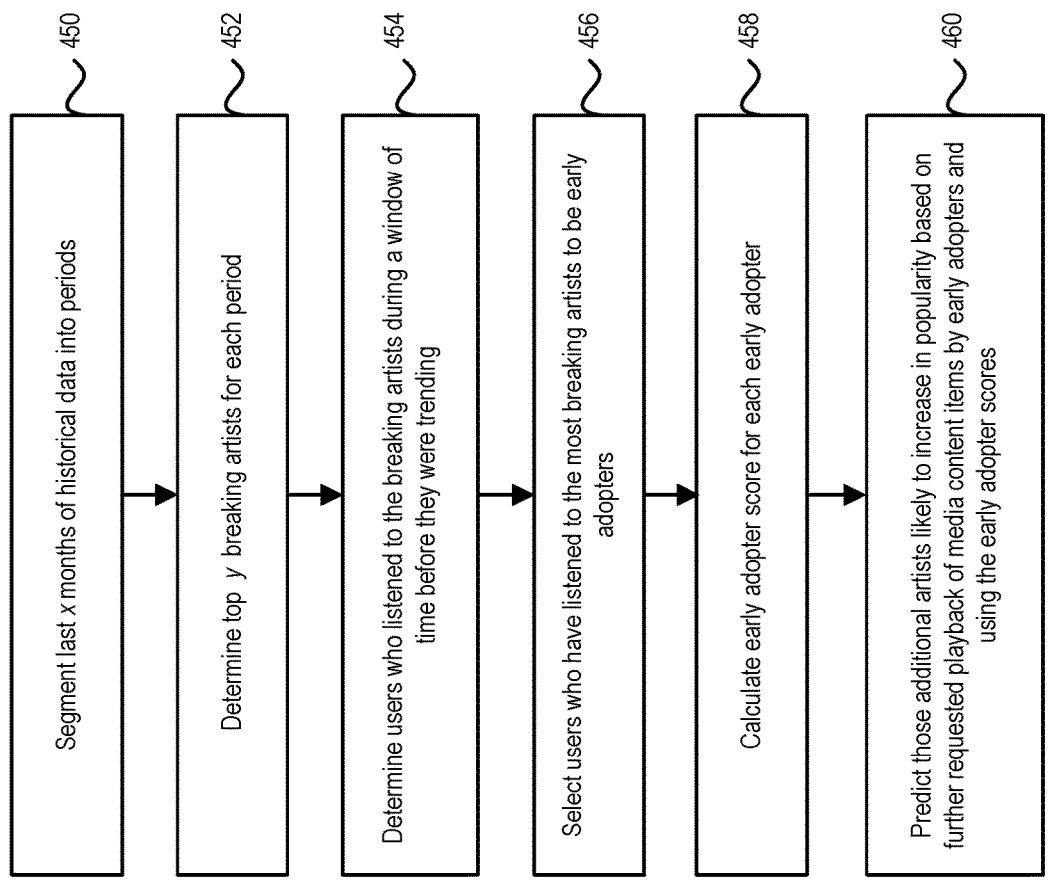
FIG. 5 is a flowchart of a method for predicting breaking artists, in accordance with an embodiment.

FIG. 5 is a flowchart of a method for predicting those artists that create media content who are more likely to increase in popularity than other artists that create media content, in accordance with an embodiment. The method includes analyzing aggregated historical data for a period of time to determine early adopters. The historical data can first be segmented in periods for analysis (Step 450). For example, the last 5 months of historical data from the time of analysis can be segmented into five one-month periods.

The method then includes determining from the historical data the top breaking artists for each period (Step 452), as described above and then determining those users who listened to the breaking artists during a window of time before they were breaking (Step 454). Those users who have listened to the most breaking artists (Step 456) are selected as early adopters. Early adopter scores are calculated for each early adopters (Step 458).

Once the early adopters are identified, the method includes predicting those additional artists that create media content who are more likely to increase in popularity than other additional artists that create media content based on further requested playback of media content items by early adopters and using the early adopter scores (Step 460).

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for predicting an artist that creates media content who is more likely to increase in popularity than other artists, the system comprising:
one or more processors and a media server executing thereon; and
a device memory storing computer program code which, when executed by the one or more processors, causes the media server to:
determine, based on aggregated historical data, one or more artists that are generators of media content from within a plurality of artists, as indicated by:
a minimum playback threshold indicative of a number of playback requests associated with a generator during a period of time, and
a minimum growth threshold indicative of a rate of increase of the playback requests associated with the generator;
determine a plurality of users, ordered by playback request count, who requested playback of media content items associated with the generators within a window of time;
identify one or more early adopters within the plurality of users based on a quantity of the generators whose media content items were requested for playback by those users, and associating a score value with each early adopter indicative of their playback requests of generator media content; and
predict an additional artist that creates media content who is more likely to increase in popularity based on a number of requested playbacks of media content items associated with the additional artist by the one or more early adopters weighted according to score values of the early adopters.

2. The system of claim 1, wherein the determining one or more artists that are generators of media content further includes determining a plurality of popular media content items based on the historical data from the set of aggregated historical data,
wherein the aggregated historical data includes playback count for a plurality of media content items,
wherein a popular media content item is determined based on growth in playback count over time for a media content item from the plurality of media content items that exceeds a first threshold; and
determining the one or more artists that are generators of the plurality of popular media content items.

3. The system of claim 1, wherein determining users who requested playback of media content items associated with the determined one or more artists that are generators within a window of time further includes determining users who requested playback of media content items associated with the determined artists that are one or more generators for a period of time before a second threshold.

4. The system of claim 2, wherein the aggregated historical data further includes search count for media content items, and wherein a popular media content item is further determined based on growth over time in search count for a media content item that exceeds a third threshold.

5. The system of claim 2, wherein the memory storing computer program code further causes the media server to perform the steps including generating the set of aggregated historical data by aggregating playback request data for a plurality of users, wherein the playback request data includes identity of a media content item requested by a user for playback and identity of a generator of the media content item.

6. The system of claim 2, wherein the device memory storing computer program code, when run in the one or more processors, causes the media server to periodically repeat the steps of determining the plurality of popular media content items, determining the one or more artists that are generators of the plurality of popular media content items, determining the users who requested playback of media content items associated with the determined one or more artists that are generators, determining the one or more early adopters from the determined users, and predicting an artist that creates media content who is more likely to increase in popularity.

7. The system of claim 1, wherein predicting the additional artist that creates media content who is more likely to increase in popularity includes
  determining an early adopter score for each of the one or more early adopters, by determining a statistical or other correlation between one or more user streams associated with the early adopter and a relative growth rate of an associated artist; and
  calculating a play score for each additional generator of media content by summing playback requests by a number of the one or more early adopters requesting playback of media content associated with the additional generator, weighted by each early adopter score.

8. A method for predicting an artist that creates media content who is more likely to increase in popularity than other artists, comprising:
  determining, based on aggregated historical data, one or more artists that are generators of media content from within a plurality of artists, as indicated by:
    a minimum playback threshold indicative of a number of playback requests associated with a generator during a period of time, and
    a minimum growth threshold indicative of a rate of increase of the playback requests associated with the generator;
  determining a plurality of users, ordered by playback request count, who requested playback of media content items associated with the generators within a window of time;
  identifying one or more early adopters within the plurality of users based on a quantity of the generators whose media content items were requested for playback by those users, and associating a score value with each early adopter indicative of their playback requests of generator media content; and
  predicting an additional artist that creates media content who is more likely to increase in popularity based on a number of requested playbacks of media content items associated with the additional artist by the one or more early adopters weighted according to score values of the early adopters.

9. The method of claim 8, further comprising:
  determining a plurality of popular media content items based on the historical data from the set of aggregated historical data,
  wherein the aggregated historical data includes playback count for a plurality of media content items,
  wherein a popular media content item is determined based on growth in playback count over time for a media content item from the plurality of media content items that exceeds a first threshold; and
  determining the one or more artists that are generators of the plurality of popular media content items.

10. The method of claim 8, wherein determining users who requested playback of media content items associated with the determined one or more artists that are generators within a window of time further includes determining users who requested playback of media content items associated with the determined one or more artists that are generators for a period of time before a second threshold.

11. The method of claim 9, wherein the aggregated historical data further includes search count for media content items, and wherein a popular media content item is further determined based on growth over time in search count for a media content item that exceeds a third threshold.

12. The method of claim 9, wherein generating the set of aggregated historical data includes aggregating playback request data for a plurality of users, wherein the playback request data includes identity of a media content item requested by a user for playback and identity of a generator of the media content item.

13. The method of claim 9, further comprising periodically repeating the steps of determining the plurality of popular media content items, determining the one or more artists that are generators of the plurality of popular media content items, determining the users who requested playback of media content items associated with the determined one or more artists that are generators, determining the one or more early adopters from the determined users and predicting an artist that creates media content who is more likely to increase in popularity.

14. The method of claim 8, wherein predicting the additional artist that creates media content who is more likely to increase in popularity includes
  determining an early adopter score for each of the one or more early adopters, by determining a statistical or other correlation between one or more user streams associated with the early adopter and a relative growth rate of an associated artist; and
  calculating a play score for each additional generator of media content by summing playback requests by a number of the one or more early adopters requesting playback of media content associated with the additional generator, weighted by each early adopter score.

15. A non-transitory computer readable storage medium, including instructions stored thereon which when read and executed by one or more computers cause the one or more computers to perform a method comprising:
  determining, based on aggregated historical data, one or more artists that are generators of media content from within a plurality of artists, as indicated by:
    a minimum playback threshold indicative of a number of playback requests associated with a generator during a period of time, and
    a minimum growth threshold indicative of a rate of increase of the playback requests associated with the generator;
  determining a plurality of users, ordered by playback request count, who requested playback of media content items associated with the generators within a window of time;
  identifying one or more early adopters within the plurality of users based on a quantity of the generators whose media content items were requested for playback by those users, and associating a score value with each early adopter indicative of their playback requests of generator media content; and
  predicting an additional artist that creates media content who is more likely to increase in popularity based on a number of requested playbacks of media content items associated with the additional artist by the one or more early adopters weighted according to score values of the early adopters.

16. The non-transitory computer readable storage medium of claim 15, including instructions stored thereon which when read and executed by one or more computers cause the one or more computers to perform the steps further comprising:
   determining a plurality of popular media content items based on historical data from a set of aggregated historical data,
   wherein the aggregated historical data includes playback count for a plurality of media content items,
   wherein a popular media content item is determined based on growth in playback count over time for a media content item from the plurality of media content items that exceeds a first threshold; and
   determining the one or more artists that are generators of the plurality of popular media content items.

17. The non-transitory computer readable storage medium of claim 15, wherein determining users who requested playback of media content items associated with the determined one or more artists that are generators within a window of time further includes determining users who requested playback of media content items associated with the determined one or more artists that are generators for a period of time before a second threshold.

18. The non-transitory computer readable storage medium of claim 16, wherein the aggregated historical data further includes search count for media content items, and wherein a popular media content item is further determined based on growth over time in search count for a media content item that exceeds a third threshold.

19. The non-transitory computer readable storage medium of claim 16, wherein generating the set of aggregated historical data includes aggregating playback request data for a plurality of users, wherein the playback request data includes identity of a media content item requested by a user for playback and identity of a generator of the media content item.

20. The non-transitory computer readable storage medium of claim 14, including instructions stored thereon which when read and executed by one or more computers cause the one or more computers to perform the steps further comprising:
   periodically repeating the steps of determining the plurality of popular media content items, determining the one or more artists that are generators of the plurality of popular media content items, determining the users who requested playback of media content items associated with the determined one or more artists that are generators, determining the one or more early adopters from the determined users and predicting an artist that creates media content who is more likely to increase in popularity.

21. The system of claim 1, wherein the memory storing computer program code further causes the media server to
   order the determined one or more artists that are generators of media content, based on a growth rate and a total playback count, and
   order the determined users that requested playback of media content items associated with the generators, according to a playback request count associated with each user.

* * * * *